R. SCHLAEPFER.
AIR SUPPLY SYSTEM FOR COMBUSTION ENGINES.
APPLICATION FILED SEPT. 21, 1914.
1,230,330.
Patented June 19, 1917.
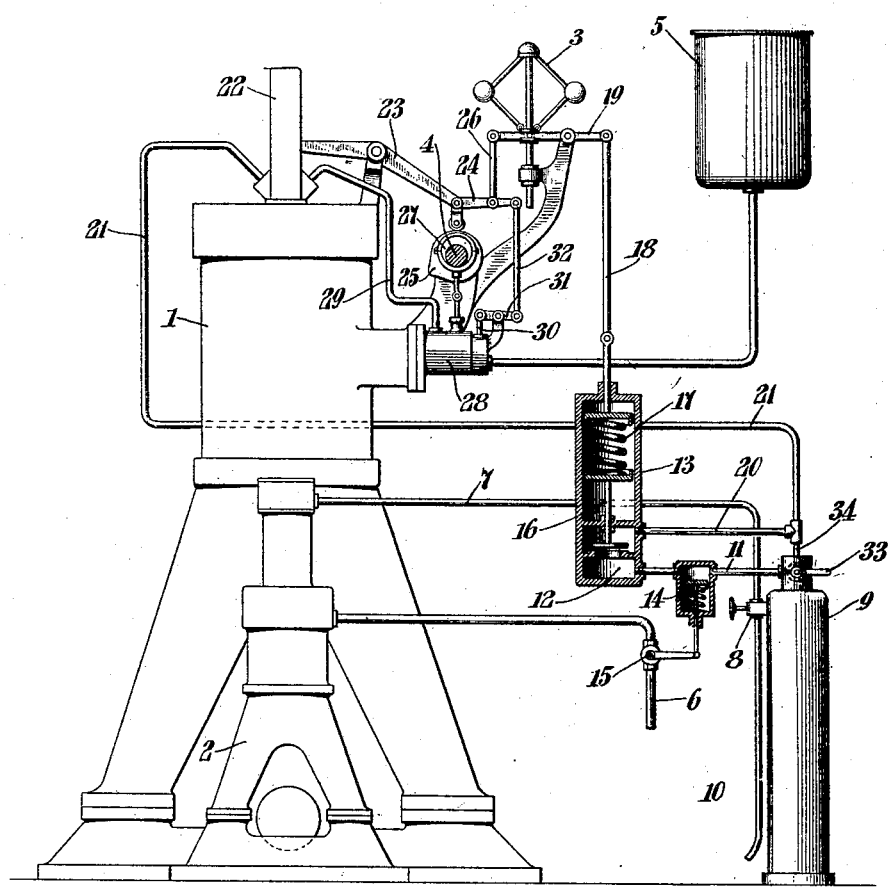
Witnesses:
John E. Prager
K. L. Grout
Robert Schlaepfer
Inventor
By Attorneys

UNITED STATES PATENT OFFICE.

ROBERT SCHLAEPFER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

AIR-SUPPLY SYSTEM FOR COMBUSTION-ENGINES.

1,230,330.  Specification of Letters Patent.  Patented June 19, 1917.

Application filed September 21, 1914. Serial No. 862,829.

*To all whom it may concern:*

Be it known that I, ROBERT SCHLAEPFER, a citizen of the Republic of Switzerland, residing at Winterthur, Canton of Zurich, Switzerland, have invented the following new and useful Improvements in Air-Supply Systems for Combustion-Engines.

The invention consists in the organization of means whereby the reserve supply of compressed air, in Diesel engines for instance, is automatically maintained at a predetermined, constant pressure, irrespective of withdrawals therefrom for other than engine purposes. A preferred embodiment of the invention is illustrated in the accompanying drawing, which is schematic and illustrative of the principle of the invention, whereby others may be informed as to the manner of constructing, compounding and using the same. In the said drawing, the engine illustrated in outline may be assumed to be a Diesel type engine, wherein a liquid fuel is injected into the combustion space by the aid of air highly compressed for that purpose. The engine appears in end view, and may be assumed to comprise any number of cylinders, 1, and an air compressor, 2, together with a governor, 3, cam-shaft, 4, fuel tank, 5, and such other appurtenances as are usual in engines of this type. The air compressor 2 is a two or more stage compressor taking air from the atmosphere through its suction pipe 6 and discharging compressed air through its delivery pipe 7 and shut-off valve 8 into a storage reservoir tank 9. The compressed air in this tank 9 is utilized primarily as injection air for the engine fuel, but may also be passed through the pipe 10 to other apparatus, as, for example, the whistle, air brake or other air-operated devices used on vehicles propelled by combustion engines. The means of utilizing such compressed air for the injection of the fuel are combined and coördinated with automatic pressure-regulating organs, whereby notwithstanding the withdrawals from the reservoir 9 the pressure therein will be preserved substantially constant. According to this invention the air from the reservoir 9 passes through a pipe 11 to the entrance chamber 12 of a fluid pressure regulator 13, and interposed in the said pipe 11 is a spring-actuated cylinder and piston 14, the piston-rod of which is connected to a valve 15 in the suction pipe of the air compressor. The pressure acting upon the piston 14 will compress the spring thereof more or less and thereby determine a position of adjustment of the intake valve 15 which will control, correspondingly, the pressure in the air compressor delivery pipe 7, as will be evident. While the piston 14 is illustrated in the present case as interposed in the pipe line 11, it will be evident that it might be otherwise related thereto, so long as the high pressure in the tank is brought to act thereon. Escape of the air from the entrance chamber of the fluid pressure regulator 13 is controlled by a valve 16, which is loaded by the pressure of a spring 17, the tension of which is under control of the engine governor 3. This control may be exerted in various ways, and in the schematic illustration consists of a link 18 connected to one end of the governor lever 19 and in such manner that a reduced load on the engine and a corresponding increased speed of the governor operates to increase the pressure of the spring and oppose opening of the valve 16. The air overcoming the load of the valve 16 passes by way of the pipes 20 and 21 direct to the fuel valve 22, wherein it will be understood that it may be used either for the injection of the fuel or for the purpose of starting the engine in motion, in which case the valve 22 may be assumed to be also the starting valve. As a fuel valve, it is operated by a valve lever 23 carrying a bell-crank 24 at its end, arranged to be engaged by a cam 25 on the cam-shaft 4. The bell-crank 24 is illustrated as having a friction roller for engagement with the cam, and also as under the control of the governor by means of a link 26 pivotally connected to the governor lever 19, the general arrangement being such that variations in the position of the governor balls will produce corresponding variation in the extent of operation of the fuel valve. The cam-shaft 4 by means of an eccentric 27 operates the plunger of the fuel pump 28, which pump takes liquid from the reservoir and discharges it into the fuel valve 22 through the oil-pipe 29. The amount of oil so delivered on each reciprocation of the pump plunger is also subject to the control of the governor. In the present case, such control is diagrammatically represented as effected by an appropriate timing of the operation of the suction valve of the pump, for which purpose the suction valve stem, or a small plunger 30 controlling the same, is connected to one end of a lever 31, the other end of which is connected by a link 32 to the lever 24, which latter is connected to the governor lever 19 as above described.

From the arrangement of parts above described, it will be understood that on a diminishing load and increasing speed of the engine, the fuel valve and the oil supply means will be correspondingly restricted in their effective operations, and coincidently therewith the load on the pressure regulator valve 16 will be increased by the depression of the link 18 and its connected parts, so that the pressure of the injection air escaping past the valve 16 will be immediately reduced to an extent corresponding to the reduction of load. Such reduction of pressure in the injection line may result in a simultaneous increase in the high pressure side of the regulator, thereupon causing the intake valve 15 to be set to a more restricted position, and thus automatically preventing the accumulation of an undue pressure in the storage reservoir 9. The reverse operations take place on an increasing load, that is to say, the pressure in the injection line 20, 21 will be increased by the relief of the spring load on the valve 16, while the diminishment of the pressure on the high-pressure side of said valve will result in an opposite automatic adjustment of the intake valve 15, permitting a freer passage of air through the compressor's intake pipe 6.

In order that on emergencies or for starting the engine the full contents of the reservoir 9 may be utilized at such pressure as may then obtain in it, the valve 33 is provided. This valve may be assumed to be a three-way valve adapted in one position—the position indicated in the drawing—to direct the air of the tank into the pipe 11 for the operation of the system, as just described, and in another position to admit the air of the tank direct to the pipe 21 by way of the by-pass 34.

It will be understood, as already stated, that the drawing above described is merely diagrammatic and that the arrangement of the parts may be widely varied from the arrangement taken for illustration. There is no intention to limit the scope of this patent to any of the details above described, except as specified in the claims following hereon.

I claim:

1. An air supply system for internal combustion engines comprising the combination with the engine, its fuel valve, air compressor, storage reservoir and air injection line leading to the fuel valve, of an automatic pressure regulator in said air injection line for regulating the pressure of the air passing to the fuel valve, and means on the high-pressure side of said regulator for controlling the operation of the air compressor.

2. An air supply system for internal combustion engines, comprising the combination with the engine, its compressor, storage reservoir and air injection line, of a governor-controlled pressure regulator for said air injection line and means for controlling the output of the compressor in accordance with the pressure in the storage reservoir.

3. In a combustion engine, the combination of the engine governor, a fuel pump controlled thereby, an air compressor driven by the engine, a storage reservoir for the air compressor and serving the fuel valve of the engine, in combination with a pressure regulator controlled by the engine governor and means subject to the pressure on the high-pressure side of the regulator for controlling the pressure in the storage reservoir.

4. In apparatus of the kind described, the combination with the fuel injection valve, the air line leading thereto, of a driven engine governor, a valve in said air line, a spring acting on said valve and mechanical connections whereby the governor varies the tension of the spring.

5. In apparatus of the kind described, the combination of the fuel air injection line, a spring-loaded pressure regulator therein, an engine governor controlling the tension of the spring thereof, an air compressor and means whereby the air pressure in one part of the pressure regulator controls the intake passage to the compressor.

In testimony whereof, I have signed this specification in the presence of two witnesses.

ROBERT SCHLAEPFER.

Witnesses:
CARL GUBLER,
ALBERT KORTE.

Copies of this patent may be obtained for five cents each, by addressing the "Commissioner of Patents, Washington, D. C."